United States Patent
Clavier

(10) Patent No.: US 7,157,862 B2
(45) Date of Patent: Jan. 2, 2007

(54) PROTECTION DEVICE FOR A CHOPPING SUPPLY AND A VEHICLE LIGHTING DEVICE

(75) Inventor: Philippe Clavier, Bobigny (FR)

(73) Assignee: Valeo Vision (FR)

( * ) Notice: Subject to any disclaimer, the term of this patent is extended or adjusted under 35 U.S.C. 154(b) by 0 days.

(21) Appl. No.: 11/044,852

(22) Filed: Jan. 26, 2005

(65) Prior Publication Data

US 2005/0168160 A1    Aug. 4, 2005

(30) Foreign Application Priority Data

Jan. 30, 2004    (FR) .................................. 04 00935

(51) Int. Cl.
*H05B 37/02* (2006.01)
*H02H 3/18* (2006.01)
*B60L 1/14* (2006.01)

(52) U.S. Cl. ...................... 315/219; 315/225; 315/308; 307/10.8; 361/87

(58) Field of Classification Search .................. 315/77, 315/82, 224–225, 276, 291, 307, 308, 219, 315/223, 246, 283, 287; 307/10.1, 10.7, 307/10.8; 361/78, 87
See application file for complete search history.

(56) References Cited

U.S. PATENT DOCUMENTS

| | | | | |
|---|---|---|---|---|
| 5,691,696 A | * | 11/1997 | Mazies et al. | 340/471 |
| 6,288,501 B1 | | 9/2001 | Nakamura et al. | 315/307 |
| 6,340,870 B1 | | 1/2002 | Yamashita et al. | 315/308 |
| 6,819,059 B1 | * | 11/2004 | Block et al. | 315/241 S |
| 6,876,153 B1 | * | 4/2005 | Ito et al. | 315/82 |
| 6,960,886 B1 | * | 11/2005 | Ishizuka | 315/80 |
| 2003/0102816 A1 | | 6/2003 | Buiji et al. | 315/224 |

FOREIGN PATENT DOCUMENTS

EP    1043919    10/2000

OTHER PUBLICATIONS

French Search Report dated Sep. 2004, Aug. 2004.

* cited by examiner

*Primary Examiner*—Thuy Vinh Tran
(74) *Attorney, Agent, or Firm*—Morgan & Finnegan, LLP

(57) ABSTRACT

The invention concerns a protection device for a chopping supply of the type comprising a voltage converter whose secondary is connected to a load such as a light source of the xenon lamp type, and whose primary is connected to an energy source and is controlled by a power switch possibly controlled by a control unit, characterised in that it comprises:
- at least one first means for producing an image of a current flowing in the power switch from a current flowing in an energy storage capacitor connected in the primary circuit of the voltage converter, connected to
- at least one second means for detecting a critical current level on the image of a current, connected to
- at least one third means of controlling the power switch in order to modify the state of conduction of the power switch when a critical current level is detected.

21 Claims, 1 Drawing Sheet

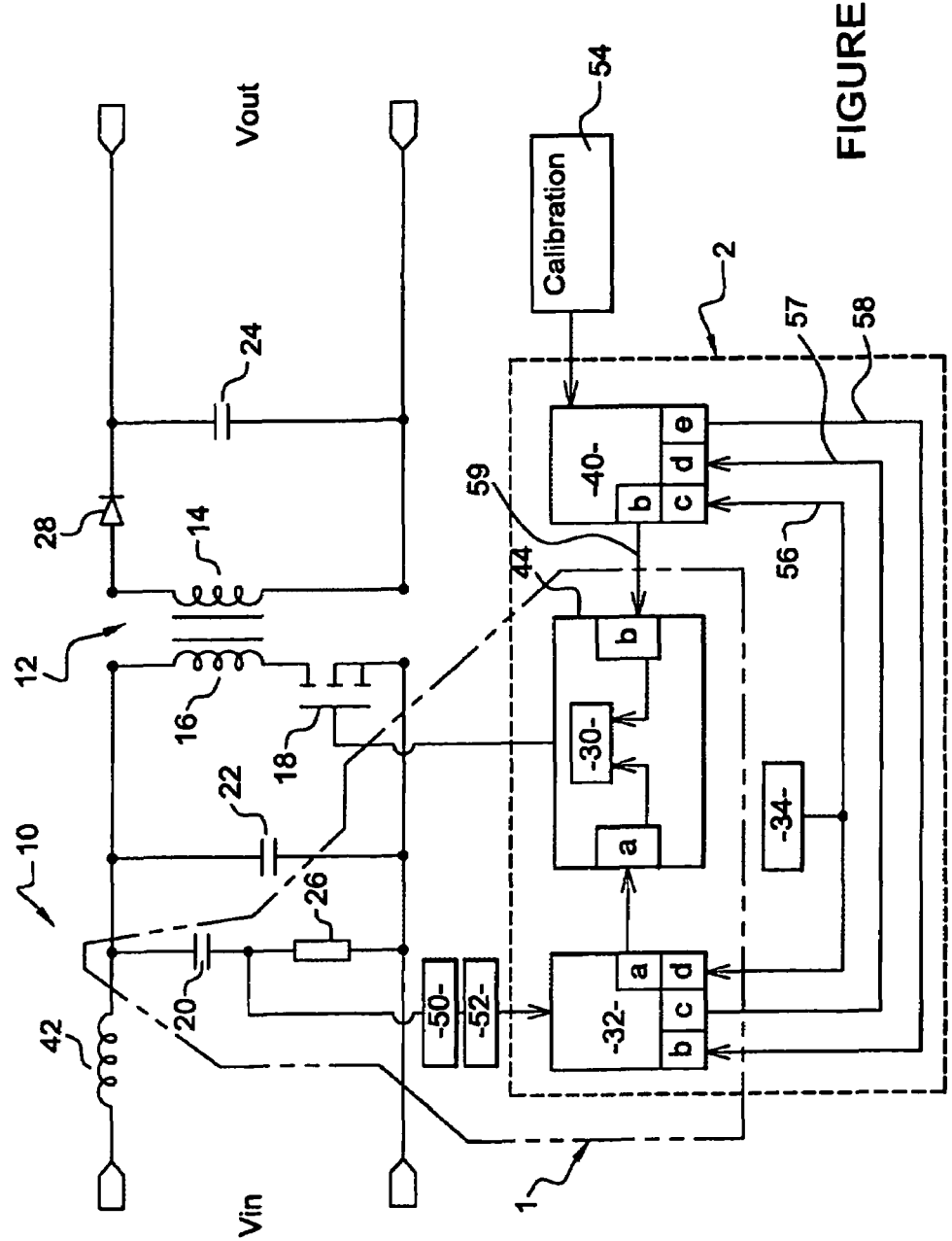

PROTECTION DEVICE FOR A CHOPPING SUPPLY AND A VEHICLE LIGHTING DEVICE

FIELD OF THE INVENTION

The invention concerns a protection device for a chopping supply. It also concerns a vehicle lighting device using such a protection device.

BACKGROUND OF THE INVENTION

More particularly, the invention proposes a protection device for a chopping supply of the type comprising a voltage converter whose secondary is connected to an electrical load and whose primary is connected to an electrical source such as a light source of the xenon lamp type (also referred to as a discharge lamp) and controlled by a power switch.

Such a chopping supply is intended, for example, to supply any lighting and/or signalling device, of the motor vehicle headlight type. The secondary of the voltage converter is connected to the headlight and the primary of the voltage converter is connected to a battery of the motor vehicle on-board system.

In a chopping supply, the phenomena of thermal runaway of the converter, due to high temperatures, appear and affect the characteristics of the electronic components.

Such a thermal runaway occurs particularly in an automobile environment, the temperature being high in the engine compartment where the headlight and its control supply proper are situated.

Likewise, in production, the burn-in of the controlled supplies of the headlights is effected partly on the lamp. After numerous burn-in cycles, the lamps are worn and no longer remain lit. The controlled supply or ballast is then constantly in lighting phase with overpower regimes, which, added together at a high temperature, give rise to thermal runaway of the voltage converter and therefore destruction of the power switch which effects the chopping of the voltage supply to the primary.

The phenomena of thermal runaway thus result in a high current surge dangerous to the primary of the voltage converter, especially when it is produced in the form of a magnetic transformer with coils. A critical current level causes destruction of the power switch. A problem is therefore posed of detecting a critical current level and acting rapidly before the destruction of the components.

In the document EP-A2-1.043.919, a protection device is described which monitors the current in the power switch, particularly a transistor, by measuring the voltage drop at its terminals, particularly the voltage between the drain and source of the transistor, proportional to the current, in the conductive state of the transistor. A comparator opens the transistor when the voltage drop is too great.

One drawback of such a solution is that the measurement of the voltage is dependant on the dynamic resistance of the transistor, whose tolerance is not very precise, and consequently the protection is not very reliable.

Another drawback is that, when the ambient temperature is high, the converter is more sensitive to thermal runaway which causes damage to the transistor, or even destruction of the transistor. However, the solution proposed by the document does not take the temperature into account. The transistor is cut off only at high currents flowing in the primary induction coil. The solution of the state of the art does not make it possible to anticipate the appearance of such currents.

Another drawback is that, when the current is very high, phenomena of magnetic saturation of the transformer used as a voltage converter appear. The power delivered by the secondary is no longer sufficient to supply the load connected to the secondary, particularly a headlight installation. The control unit for the headlight installation sends a power demand signal to a unit controlling the chopping supply. The induction current of the voltage converter increases but, the transformer still being saturated, the chopping supply cannot always supply the power necessary for supplying the headlight installation. However, the regulations require consistency and an optical flux level at the headlights. The saturation of the transformer is thus a significant problem for the supply to the headlights. In addition, the maintenance of a high power demand by the control unit for the headlight installation also maintains the situation causing a dangerous current surge, which increases the problem of destruction of the switch all the more.

SUMMARY OF THE INVENTION

In order to remedy these drawbacks, the invention concerns a protection device for a chopping supply of the type comprising a voltage converter whose secondary is connected to a load such as a light source of the xenon lamp type, and whose primary is connected to an energy source and is controlled by a power switch possibly controlled by a control unit, characterised in that it comprises:

- at least one first means for producing an image of a current flowing in the power switch from a current flowing in an energy storage capacitor connected in the primary circuit of the voltage converter, connected to
- at least one second means for detecting a critical current level on the image of a current, connected to
- at least one third means of controlling the power switch in order to modify the state of conduction of the power switch when a critical current level is detected.

According to another aspect of the invention, the first, second and third means are configured so as to form a first loop for rapid regulation of the state of conduction of the power switch and the device comprises a slow regulation loop comprising a controller for the overall functioning of the load connected to the secondary, the second critical level detection means and the third power switch control means.

According to another aspect of the invention, the second means for detecting a critical current level comprises a means of comparing analysis characteristics of the image current according to analysis criteria such as the comparison with a predetermined critical threshold.

According to another aspect of the invention, the comparison means is active permanently whilst taking into account only the currents passing through the power switch.

According to another aspect of the invention, the second means comprises a means for activating the image current comparison means when current passes through the power switch.

According to another aspect of the invention, the second means for detecting a critical current level comprises a means for emitting a signal characteristic of a critical current level, connected to a means of using the signal characteristic of a critical current level belonging to the third power switch control means.

According to another aspect of the invention, the second means for detecting a critical current level cooperates with a temperature sensor in order to measure an ambient temperature.

According to another aspect of the invention, the second means for detecting a critical current level comprises a means for adapting the analysis criteria such as the threshold according to the temperature measured by the temperature sensor on the basis of a pre-defined function such that $S=f(T)$.

According to another aspect of the invention, the power switch comprises a transistor of the n-channel enhancement-mode MOSFET type.

According to another aspect of the invention, the third power switch control means comprises a pulse width modulator whose pulse width and/or pulse shape is determined so as to control the conduction state of the power switch when a critical current level is detected.

According to another aspect of the invention, the second means for producing an image of a current flowing in the power switch comprises a series association of at least one capacitor and at least one resistor, the said association being connected in parallel to the primary.

According to another aspect of the invention, the second means for producing an image of a current flowing in the power switch comprises a filtering means and/or a circuit protecting against interfering signals (overvoltages, transients, etc).

According to another aspect of the invention, the second means for producing an image of a current flowing in the power switch comprises a calibration means in order to compensate for the scatterings in the components of the device which acts on the means of comparing analysis characteristics of an image current according to analysis criteria such as the comparison with a predetermined critical threshold.

According to another aspect of the invention, the controller comprises a means for reducing the power demanded at the primary when a critical current level is detected, at least for a period of magnetic saturation of the voltage converter.

The invention also concerns a lighting device for vehicles, of the type comprising a chopping supply and at least one headlight with a discharge lamp connected as an electrical load to the output of the chopping supply. The lighting device comprises a protection device according to the invention.

According to another aspect of the invention, the chopping supply comprises a pulse width modulator whose pulse width and/or pulse shape is determined according to a power demanded by the control unit for controlling the state of conduction of the power switch of the chopping supply.

According to another aspect of the invention, the control unit comprises a means for controlling a determined reduction in power demanded when a critical current level is detected compatible with the requirements of the regulation of the load connected to the secondary of the supply.

One advantage of the invention is that the measurement of the current representing the current flowing in the primary of the converter is not dependent on the dynamic resistance of the transistor used as a power switch. The measurement of such a current is therefore reliable. It makes it possible, despite the scattering in the characteristics of the transistors used as a power switch, to detect a critical current level flowing in any type of power switch.

Another advantage of the invention is that it takes account of the temperature which, when it is too high, is responsible for the thermal runaway of the voltage converter and consequently the destruction of the power switch.

Another advantage of the invention is that it makes it impossible to anticipate the phenomena of thermal runaway and implements the protection before the appearance of such phenomena.

Another advantage of the invention is that it prevents prolonged saturation of the magnetic materials of the voltage converter.

BRIEF DESCRIPTION OF THE DRAWINGS

The invention will be better understood, and other aims, characteristics, details and advantages thereof will emerge more clearly from the following explanatory description given with reference to the accompanying drawing, in which the FIGURE depicts schematically the device of the invention.

DESCRIPTION OF THE PREFERRED EMBODIMENTS

The chopping supply 10 of the FLYBACK type comprises a voltage converter 12, particularly a transformer, whose secondary 14 is connected to a load (not shown) to which a voltage Vout is applied and whose primary 16 is connected to an energy source (not shown) applying an input voltage Vin and is controlled by a power switch 18.

Advantageously, the power switch 18 is a transistor of the n-channel enhanced-mode MOSFET type. The transistor is controlled so that it functions as a power switch.

In one embodiment, the energy source connected to the primary 16 is a battery for motor vehicles and the load connected to the secondary 14 is a headlight installation. The chopping supply 10 is therefore intended to supply the headlight installation by supplying to it a stable supply voltage and sufficient power so that the headlights produce a constant and regulatory light flux.

Capacitors 20 and 22 connected to the primary 16 supply energy to the primary 16 when the power switch 18 is closed. The capacitors 20 and 22 store energy when the power switch 18 is open.

The capacitor 22 also serves as decoupling for the input wiring of the voltage converter 12.

A capacitor 24 connected to the secondary 14 supplies energy to a load connected to the output of the voltage converter 12 when a diode 28 is off, and serves to smooth an output voltage Vout of the voltage converter 12. The capacitor 24 stores energy when the diode 28 is on.

A resistor 26 is connected to the primary 16 in series with the capacitor 20.

An inductor 42 is connected to the primary 16. The chopping supply 10 is connected to a control unit 14 in order to control and actuate the power switch 18.

The chopping supply 10 is based on the principle of the inductive-storage chopper and functions in two distinct phases (or modes). The first phase corresponds to energy storage in the form of magnetic fields in the transformer, the secondary 14 of the latter being open. The second phase corresponds to a restoration of this energy to the secondary 14 of the transformer.

The first phase is an energy storage phase. When the power switch 18 is closed, the primary 16 is supplied by the voltage source Vin. In particular the capacitors 20 and 22 supply energy to the primary 16. The diode 28 placed at the output of the secondary 14 is reverse biased and consequently no current flows in the secondary winding 14. The capacitor 24 supplies the output energy of the chopping supply 10. During this storage phase, only the winding of the primary 16 is active and the transformer 12 can be treated as a simple inductor.

The second phase is an energy transfer phase. When the power switch 18 is open, the current in the winding of the primary 16 is zero and the capacitors 20 and 22 store energy. The current induced now flows in the secondary 14, the diode 28 placed at the output being conductive, and the capacitor 24 stores energy. During this phase, known as flyback, the secondary current will decrease until it reaches zero in the case of a complete transfer of energy or until the time of closure of the power switch 18 in the case of a partial energy transfer, and until the chopping cycle resumes.

According to the invention, the chopping supply 10 comprises a device for protection against the dangerous currents flowing in the primary 16. The presence of dangerous current is liable to damage the electronic components, particularly the power switch 18.

The protection device thus comprises:
 a first means 20, 26 for producing an image of a current flowing in the power switch 18;
 a second means 32 for detecting a critical current level;
 a third means 30 of controlling the power switch 18.

The first means 20, 26 for producing an image of a current flowing in the power switch 18 comprises, in one embodiment, a series association of a capacitor 20 and a resistor 26. The association 20, 26 is connected in parallel to the primary 16. One advantage of the invention in producing the image of a current flowing in the power switch 18 will be understood here. This is because a measurement of the current flowing in the power switch 18 can be made directly by measuring the voltage at the terminals of the power switch 18 and knowing the dynamic resistance of the transistor. However, this proves to be fairly unreliable since the dynamic resistance between the drain and source of the power switch 18 is a characteristic subject to considerable scattering. Consequently the advantage of producing such an image is that the latter is not dependent on a parameter such as the dynamic resistance of the power switch 18 and the measurement of this image is therefore reliable.

The second means 32 for detecting a critical current level comprising an input terminal of the current image issuing from the means of measuring the image of the primary current and an output terminal, in particular of a "two state" signal which takes a value signalling a critical current level and another value signalling that the primary current is correct.

In one embodiment, the means for detecting a critical current level comprises a circuit for analysing the waveform of the image current supplied at the input of the means 32. According to waveform analysis criteria, the said criteria being recorded in a memory, not shown, of the means 32 are compared with the input waveform analysis result so that, according to predetermined comparison criteria, an output signal of the means 32 is placed at the critical current level value or at the correct current value.

In another embodiment, the circuit for analysing a waveform comprises a comparator comparing the image of the current with a predetermined threshold, recorded in the criteria memory.

In another embodiment, the comparator comparing the image of the current with a predetermined threshold is activated during a first part when the current rises in the primary during a chopping period. For example, for a supply chopped over a period of ten microseconds, the duration of putting the power switch under conduction being seven microseconds, this period comprises an initial part, referred to as the waveform analysis window, of one hundred nanoseconds for example, during which the input signal of the means 32 is compared with the predetermined threshold.

It should be noted that this provision of the invention makes it possible to measure a quantity directly related to the time derivative of the primary current $(dr_p/dt)_o$ at the start of the pulse controlling the putting of the power switch under conduction. As a result, as soon as the rise in the primary current begins, the protection device can fulfil its role even before an excessively high current appears. It should be understood that this characteristic of the invention of anticipating the dangerous situation is important since the EMF induced on the inductance primary Lp is of the form $-L(dIp/dt)$.

The third means 30 of controlling the power switch 18 comprises a pulse width modulator 30. The pulse width modulator 30 has a dual function and controls the power switch 18 whilst producing a signal, for example rectangular, periodic of period $T_r$ and of duty cycle ratio k. The switch is therefore closed for $kT_r$ and open for $(1-k)T_r$ during each period $T_r$. This recurrence is controlled according to the power demanded for determining the output voltage of the chopping supply.

The pulses of the rectangular signal have a constant amplitude and modulatable width, that is to say with a modulatable duration. The leading edges of the pulses are periodic. In order to determine the pulse duration which de facto determines the time and duration of the putting of the switch 18 under conduction, the method consists of preparing a sawtooth signal with a reference signal whose characteristics are in particular determined by the power demanded at the chopping supply. It is at this point that a lighting computer determines the optical flux of the headlight. The pulse duration ceases when the amplitudes of the signals are equal.

The second means 32 of detecting a critical current level sends a control signal to a means for opening the power switch as soon as the situation of demanding the dangerous current has been detected, and this without waiting for a destructive value of the current in the primary to be reached. In a particular embodiment, the power for opening the power switch is integrated in the pulse width modulator in order to open the power switch 18 when the image of the current represents a critical current level flowing in the power switch 18. The power switch 18 being opened, no current flows any more in the power switch 18 and the latter is thus protected against the dangerous current before the latter appears if the threshold determining the character of the critical level is adjusted sufficiently low to reflect this appearance.

In a particular embodiment, the pulse width modulator which serves to control the putting of the power switch under conduction comprises a controllable threshold value generator which serves as a reference value as described above for explaining the conventional functioning of the modulator. The output of the generator is connected to an input of the aforementioned sawtooth voltage comparator in order to ensure that the comparison output is earthed in order to open the power switch 18, a transistor is placed between the earth and the comparison input of the comparator and its conduction is controlled instantaneously by the critical current level detection signal. Other embodiments are possible for obtaining this result.

Returning to the constitution of the second means 32 for detecting a critical current level, the presence of a dangerous current in the primary 16 results from the phenomena of thermal runaway due to high temperatures. Thus, the higher the temperature, the greater the risk of appearance of a dangerous current. It is therefore necessary to anticipate the appearance of such a dangerous current before the destruction of the electronic components, particularly of the power switch 18.

To this end, the protection device comprises:
a temperature sensor 34 for measuring the ambient temperature T, connected to a means 32*d* of taking into account the second means 32 of the rapid regulation loop 1 and connected by a connection 56 to a means 40*c* of taking into account the controller 40 of the "slow" regulation loop 2;
a means 36 for adapting waveform analysis criteria of the image current described above as a threshold S according to the temperature T on the basis of a function f such that S=f(T).

The current sensor 32 detects a critical current level when the current measured becomes greater than the pre-defined threshold S which is a function of the ambient temperature.

In particular, when the temperature T increases, the means 36 for adapting the threshold S reduces the threshold S.

One advantage of the invention, where the protection device acts on lower currents for high temperatures in order to protect the electronic components before the appearance of a dangerous high current, will be understood here.

In high current situations, the magnetic transformer of the voltage converter 12 passes to the saturated state. The power supplied by the secondary 14 is no longer sufficient to correctly supply the headlight installation. The result is a reduction in the light flux produced by the headlights. Such a solution does not comply with the very strict regulations imposed vis-à-vis headlight light flux.

To resolve this problem, the protection device of the invention also comprises a means 38 for controlling a given reduction in the power required at the voltage converter 12.

In an embodiment with a pulse width modulator, the means 38 controls a reduction in the duration of the power switch being put under conduction at least in saturated mode. This reduction will permit the de-saturation of the magnetic materials and thus enable the voltage converter 12 to return more rapidly to the power required by the headlight installation.

The basic structure of the invention comprises three means:
1. A first means 20, 26 of measuring a current which is an image of the current passing through the power switch 18 to be protected;
2. A second means of detecting a critical current level 32;
3. A pilot 44 which cooperates with a modulator of the ILM type 30, which controls the control electrode of the MOS switch 18.

The basic function of the invention is to anticipate the appearance of a critical current level passing through the MOS switch 18 in order to prevent its thermal destruction, principally by preventing and/or reducing the duration of its being put under conduction for a few periods, for the time that the condition causing the critical current level disappears. The complete structure of the circuit of the invention comprises:
a rapid regulation loop 1 which comprises:
the first means of measuring the current image 20, 26;
the filter 50;
the protection circuit 52 composed of two diodes (not shown) in series;
the second means for detecting a critical current level 32;
the pilot for the state of conduction of the switch 18 principally implemented by the ILM modulator 30;
the control electrode of the MOS switch 18;
a slow regulation loop 2 which comprises:
the second means for detecting a critical current level 32, by an input "d" and an input "b" and two outputs "a" and "c";
the pilot for the state of conduction of the switch 18 by the ILM modulator 30 and an output "d";
the controller 40 and its inputs "a" and "d" and its outputs "b" and "e".

An active calibration circuit 54 is added, which configures the programs of the controller 40 when it is started up in accordance with constraints peculiar to "slow" regulation.

It will be noted that the temperature sensor 34 is connected to the inputs "d" of the second means in order to detect a critical level 32 and "c" of the controller 40.

The "rapid" regulation of the loop 1, determined by the characteristics of the first 20 and second 32 means of the invention, provides the limitation of the current passing through the MOS 18 during the period of the ILM circuit so that the switch 18 is protected from dangerous current surges.

The "slow" regulation of the loop 2 provides the regulation of the limitation possible at the "slow" loop according to the constraints of the function connected to the output Vout of the secondary of the chopping supply 10. The typical application of the invention is the lighting function on a vehicle headlight.

According to one aspect of the invention, the controller 40 is informed by the detection means 32 that a critical current level is reached. The regulation program which is executed then modifies the instructions sent to the control circuit 30, 44 of the gate electrode of the MOS switch 18 in order to reduce or inhibit the increase in the duration of conduction of the switch 18 in order to leave the critical functioning mode.

BRIEF DESCRIPTION OF THE DRAWINGS

In the FIGURE, the connection 54 transmits a critical level detection signal produced by the aforementioned means 32*c* of the second means 32 to the corresponding means 40*d* of the controller 40.

The connection 58 transmits a critical detection threshold determination signal on the second critical level detection means. This signal is determined by a means 40*c* of the controller 40 which can be adapted by an active configuration means 54 so that it is adapted to situations corresponding to functionalities of the electrical load of the chopping supply. The corresponding means of receiving the signal on the connection 58 consists of a means 32*b*, for example consisting of a threshold voltage generator whose output is applied to a reference input of the comparator for the image of the current passing through the switch 18, the image produced by the first means 20. The output of such a comparator is then applied by the output 32*a* of the second means 32 to an input 30*a* modifying the "normal" operating mode of the ILM modulator of the third means 30.

The connection 59 transmits a "slow" regulation signal generated by the controller 40 by a slow regulation means 40*b* which is received by a means 44*b* of the pilot 44 of the electronic switch 18. If the other means 30*a* or 40*a* receives no signal responding to a critical signal on the current passing through the power switch 18, it is the means 44*b* which takes control of the ILM modulator 30 by determining the degree of conduction and where applicable the waveform controlling the state of conduction of the power switch 18. The decision criterion does not relate directly to the present invention but to the objectives of the "slow" regulation loop 2 according to the functionalities of a load such as a halogen lamp of a vehicle headlight.

On the other hand, if the other means 30a or 44a receives a signal responding to a critical situation on the current passing through the power switch 18, it is the means 30a which takes control of the ILM modulator 30 by determining the degree of conduction and where applicable the waveform controlling the state of conduction of the power switch 18. The objectives of this control are determined by the "rapid" regulation loop 1 for protecting the power switch 18 from a critical current level. The determination applied by the means 30a can be an inhibition of any increase in the current passing through, a blocking of the state of conduction of the power switch 18 or a low conduction state. This state can be maintained in particular during a predetermined number of periods of the ILM modulator, or as long as the second means of detecting a critical current level is active.

What is claimed is:

1. Protection device for a chopping supply comprising a voltage converter having a secondary circuit is connected to a load, and a primary circuit is connected to an energy source and is controlled by a power switch, comprising:
   at least one energy storage capacitor connected in the primary circuit of the voltage converter;
   at least one first means for producing an image of a current flowing in the power switch; the first means receiving an input from the energy storage capacitor;
   at least one second means connected to the first means for detecting a critical current level on the image; and
   at least one third means connected to the second means for controlling the power switch; in order to modify a state of conduction of the power switch when the critical current level is detected.

2. Device according to claim 1, wherein the second means for detecting the critical current level cooperates with a temperature sensor for measuring an ambient temperature.

3. Device according to claim 2, wherein the second means for detecting the critical current level comprises means for adapting an analysis criteria according to a temperature measured by the temperature sensor based on a pre-defined function such that S=f(T), where S is a threshold value, T is the temperature measured by the temperature sensor and f is a function.

4. Device according to claim 1, wherein the power switch comprises a n-channel enhanced-mode MOSFET transistor.

5. Device according to claim 1, wherein the third means of controlling the power switch comprises a pulse width modulator whose pulse width and/or pulse shape is determined so as to control the state of conduction of the power switch when the critical current level is detected.

6. Device according to claim 1, wherein the second means for producing the image of the current flowing in the power switch comprises a series association of at least one capacitor and at least one resistor, said association being connected in parallel to the primary circuit.

7. Device according to claim 1, wherein the second means for producing the image of the current flowing in the power switch comprises a filtering means and/or a circuit for protection against interfering signals.

8. Vehicle lighting device comprising;
   a chopping supply having an output;
   at least one headlight with a xenon lamp connected as an electrical load to the output of the chopping supply; and
   a protection device according to claim 1.

9. Device according to claim 8, wherein the chopping supply comprises a pulse width modulator whose pulse width and/or pulse shape is determined according to a power demanded by the control unit for controlling the state of conduction of the power switch of the chopping supply.

10. Device according to claim 8, wherein the control unit comprises means for controlling a given reduction in power demanded when a critical current level is detected compatible with the requirements of the regulation of the load connected to the secondary circuit of the supply.

11. Device according to claim 1, wherein at least two energy storage capacitors are connected in parallel in the primary circuit of the voltage converter.

12. Device according to claim 1, wherein the third means is adapted to selectively control the switch between a non-conduction state where no current flows through the switch, a first conduction state where current flows through the switch and a second conduction state where increases in current passing through the switch are inhibited.

13. A voltage supply chopping device for a voltage converter having a primary circuit connectable to an energy source and a secondary circuit connectable to a load, the voltage converter being controllable by a power switch, the device comprising:
   at least one imaging means for producing an image of a current flowing in the power switch from an energy storage capacitor connected in the primary circuit of the voltage converter;
   at least one detecting means for detecting a critical current level on the image of the current;
   at least one controlling means for controlling the power switch to modify a state of conduction of the power switch when the critical current level is detected; and
   a controller adapted to regulate global functioning of the load connected to the secondary circuit,
   wherein the imaging, detecting and controlling means comprise a first loop for rapid regulation of the state of conduction of the power switch, and
   wherein the controller, detecting means and controlling means comprise a second slow regulation loop for regulating the load.

14. Device according to claim 13, wherein the imaging means for producing the image of the current flowing in the power switch comprises a calibration means to compensate for scatterings in components of the device which acts on the means of comparing analysis characteristics of the image current according to analysis criteria.

15. Device according to claim 13, wherein the controller comprises means for reducing power demanded at the primary circuit when the critical current level is detected, at least for a period of magnetic saturation of the voltage converter.

16. A voltage supply chopping device for a voltage converter having a primary circuit connectable to an energy source and a secondary circuit connectable to a load, the voltage converter being controllable by a power switch, the device comprising:
   at least one imaging means for producing an image of a current flowing in the power switch from an energy storage capacitor connected in the primary circuit of the voltage converter;

at least one detecting means for detecting a critical current level on the image of the current; and at least one controlling means for controlling the power switch to modify a state of conduction of the power switch when the critical current level is detected, wherein the detecting means comprises means of comparing analysis characteristics of the image current according to an analysis criteria.

17. Device according to claim 16, wherein the comparison means is active permanently whilst taking into account only the currents passing through the power switch.

18. Device according to claim 16, wherein the detecting means comprises means for activating the means of comparing the image current when current is passing through the power switch.

19. Device according to claim 18, wherein the detecting means for detecting the critical current level comprises means for emitting a signal characteristic of a critical current level, connected to means of using the signal characteristic of the critical current level belonging to the controlling means.

20. A protection device for a xenon headlamp, the device comprising a voltage converter comprising a primary circuit connected to an energy source and a secondary circuit is connected to the xenon headlamp, the primary circuit comprising a switch;

current measuring means for measuring current flow in the switch, the current measuring means being connected in parallel to the primary circuit;

a current detector adapted to detect a critical current level from the measured current flow; and a controller adapted to control a conduction state of the switch when the critical current level is detected.

21. A protection device according to claim 20, wherein the controller is adapted to selectively control the switch between a non-conduction state where no current flows through the switch, a first conduction state where current flows through the switch and a second conduction state where increases in current passing through the switch are inhibited.

* * * * *